(12) United States Patent
Yin et al.

(10) Patent No.: US 10,103,925 B2
(45) Date of Patent: Oct. 16, 2018

(54) I/Q SIGNAL TRANSMISSION METHOD AND SYSTEM, AND APPARATUS

(71) Applicant: HUAWEI TECHNOLOGIES CO., LTD., Shenzhen (CN)

(72) Inventors: Dongming Yin, Chengdu (CN); Li Xian, Chengdu (CN); Xianglin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/825,080

(22) Filed: Nov. 28, 2017

(65) Prior Publication Data

US 2018/0083822 A1     Mar. 22, 2018

Related U.S. Application Data

(63) Continuation of application No. PCT/CN2015/080417, filed on May 29, 2015.

(51) Int. Cl.
*H04L 27/36* (2006.01)
*H04L 27/34* (2006.01)
(Continued)

(52) U.S. Cl.
CPC ............. *H04L 27/34* (2013.01); *H04L 27/22* (2013.01); *H04L 27/3405* (2013.01);
(Continued)

(58) Field of Classification Search
CPC ................ H04L 27/361; H04L 27/364; H04L 2027/0032; H04L 2027/0055;
(Continued)

(56) References Cited

U.S. PATENT DOCUMENTS

2004/0128279 A1   7/2004  Matsuura et al.
2013/0083768 A1* 4/2013  Liu ..................... H04L 27/2636
                                                    370/330
2015/0295652 A1  10/2015  Luo et al.

FOREIGN PATENT DOCUMENTS

CN         1497847 A      5/2004
CN       102238628 A    11/2011
(Continued)

OTHER PUBLICATIONS

Emmanuel Ravelli et al.,"Embedded Polar Quantization",IEEE Signal Processing Letiers,vol. 14,.No. 10, Oct. 2007,total 4 pages.

*Primary Examiner* — Rahel Guarino
(74) *Attorney, Agent, or Firm* — Kilpatrick Townsend & Stockton LLP

(57) ABSTRACT

Embodiments of the present application provide an I/Q signal transmission method and an apparatus. The method includes: calculating, by a sending end, a first amplitude value and a first phase value of a first I/Q signal; obtaining, by the sending end, an amplitude quantization level of the first amplitude value and a phase quantization level of the first phase value, and the phase quantization level is used to indicate a phase value transmitted per unit of bit width; quantizing, by the sending end, the first amplitude value according to the amplitude quantization level, to obtain a second amplitude value after the quantization, and quantizing the first phase value according to the phase quantization level, to obtain a second phase value after the quantization; and transmitting, by the sending end, the second amplitude value, the second phase value, the amplitude quantization level, and the phase quantization level to a receiving end.

19 Claims, 6 Drawing Sheets

(51) Int. Cl.
*H04W 28/06* (2009.01)
*H04L 27/22* (2006.01)
*H04L 27/26* (2006.01)

(52) U.S. Cl.
CPC ........... *H04L 27/366* (2013.01); *H04W 28/06* (2013.01); *H04L 27/2627* (2013.01)

(58) Field of Classification Search
CPC . H04L 2027/0057; H04L 25/14; H04L 27/34; H04L 2025/03414; H04L 69/04; H03F 3/24; H03F 2200/336; H04B 10/613; H04B 10/6165; H04B 17/21; H04W 72/0413; H04W 28/06; H04W 28/065; H04W 92/10; H03D 7/165; H04J 14/0282; H03M 7/30; H03M 7/55; H04Q 11/0067
See application file for complete search history.

(56) References Cited

FOREIGN PATENT DOCUMENTS

| | | | |
|---|---|---|---|
| CN | 102340823 | A | 2/2012 |
| CN | 102790656 | A | 11/2012 |
| CN | 102790999 | A | 11/2012 |
| CN | 102843720 | A | 12/2012 |
| CN | 103634273 | A | 3/2014 |
| CN | 103812608 | A | 5/2014 |
| CN | 102075467 | B | 10/2014 |
| CN | 104135452 | A | 11/2014 |
| EP | 2787646 | A1 | 10/2014 |
| WO | 2005027453 | A1 | 3/2005 |
| WO | 2013044492 | A1 | 4/2013 |

\* cited by examiner

I/Q SIGNAL TRANSMISSION METHOD AND SYSTEM, AND APPARATUS

CROSS-REFERENCE TO RELATED APPLICATIONS

This application is a continuation of International Application No. PCT/CN2015/080417, filed on May 29, 2015, the disclosure of which is hereby incorporated by reference in its entirety.

TECHNICAL FIELD

The present application relates to the communications field, and in particular, to an in-phase/quadrature (I/Q) signal transmission method and system, and an apparatus.

BACKGROUND

Wireless communication is a communication manner in which information is exchanged by using a feature that an electromagnetic signal can be transmitted in free space. In a wireless communications system, radio devices such as a radio equipment control (REC) and radio equipment (RE) may exchange data by means of wireless communication. Under the condition of a fixed communication rate (for example, when a data bearing capacity of an optical fiber is fixed), communication efficiency of the radio device can be increased by compressing a bit width of an I/Q signal.

Specifically, the I/Q signal is a time-domain signal. In a Cartesian coordinate system, an I value, that is, an in-phase component, may be indicated by using the x-axis, and a Q value, that is, a quadrature component, may be indicated by using the y-axis. The I value and the Q value form the I/Q signal, to indicate a phase and an amplitude of an antenna carrier.

Currently, to compress the bit width of the I/Q signal, compression factors are usually selected by using different algorithms, and then the I/Q signal is directly compressed according to the compression factors, so that a bit width of a compressed I/Q signal is reduced. For example, a sending end compresses an I/Q signal having a bit width of eight bits to an I/Q signal having a bit width of five bits, and transmits the I/Q signal to a receiving end, and the receiving end decompresses the I/Q signal having the bit width of five bits to the I/Q signal having the bit width of eight bits. It can be learned that, in the foregoing process of compression and decompression, three bits of the I/Q signal cannot be correctly recovered, causing signal distortion, and reducing the communication efficiency of the radio device.

SUMMARY

Embodiments of the present application provide an I/Q signal transmission method and system, and an apparatus, so as to mitigate a problem of signal distortion in a wireless communication process to an extent, and increase communication efficiency of a radio device.

To achieve the foregoing objective, the following technical solutions are used in the embodiments of the present application:

According to a first aspect, an embodiment of the present application provides an I/Q signal transmission method, including:

calculating, by a sending end, a first amplitude value and a first phase value of a first I/Q signal;

obtaining, by the sending end, an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width;

quantizing, by the sending end, the first amplitude value according to the amplitude quantization level, to obtain a second amplitude value after the quantization, and quantizing the first phase value according to the phase quantization level, to obtain a second phase value after the quantization; and transmitting, by the sending end, the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

With reference to the first aspect, in a first possible implementation of the first aspect, the obtaining, by the sending end, an amplitude quantization level of the first amplitude value and a phase quantization level of the first phase value includes:

determining, by the sending end, a specified bit width for sending the first I/Q signal is sent; and determining, by the sending end, a ratio of the first amplitude value to the specified bit width as the amplitude quantization level, and determining a ratio of the first phase value to the specified bit width as the phase quantization level.

With reference to the first aspect, in a second possible implementation of the first aspect, the obtaining, by the sending end, an amplitude quantization level of the first amplitude value and a phase quantization level of the first phase value includes:

determining, by the sending end, a specified bit width for sending the first I/Q signal;

calculating, by the sending end, a maximum amplitude value in amplitude values of N I/Q signals, and a maximum phase value in phase values of the N I/Q signals, where the first I/Q signal is any I/Q signal in an I/Q signal group that includes the N I/Q signals, and N>1; and determining, by the sending end, a ratio of the maximum amplitude value to the specified bit width as the amplitude quantization level, and determining a ratio of the maximum phase value to the specified bit width as the phase quantization level.

With reference to any one of the first aspect or the first or second possible implementation of the first aspect, in a third possible implementation of the first aspect, the quantizing, by the sending end, the first amplitude value according to the amplitude quantization level, to obtain a second amplitude value after the quantization includes:

querying, by the sending end, a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and using, by the sending end, a product of the first amplitude value and the amplitude quantization factor as the second amplitude value.

With reference to any one of the first aspect or the first or second possible implementation of the first aspect, in a fourth possible implementation of the first aspect, the quantizing the first phase value according to the phase quantization level, to obtain a second phase value after the quantization includes:

querying, by the sending end, a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and using, by the sending end, a product of the first phase value and the phase quantization factor as the second phase value.

With reference to any one of the first aspect or the first to fourth possible implementations of the first aspect, in a fifth possible implementation of the first aspect, the transmitting, by the sending end, the second amplitude value, the second phase value, the amplitude quantization level, and the phase quantization level to a receiving end includes:

transmitting, by the sending end, the amplitude quantization level and the phase quantization level by using a control word bit in the Common Public Radio Interface CPRI protocol, and transmitting the second amplitude value and the second phase value by using a data word bit in the CPRI protocol.

With reference to any one of the first aspect or the first to fifth possible implementations of the first aspect, in a sixth possible implementation of the first aspect, the calculating, by a sending end, a first amplitude value and a first phase value of a first I/Q signal includes:

mapping, by the sending end, the first I/Q signal to a first quadrant in a Cartesian coordinate system; and extracting, by the sending end by using a coordinate rotation digital computer method, the first amplitude value and the first phase value from the first I/Q signal after the mapping.

According to a second aspect, an embodiment of the present application provides an I/Q signal transmission method, including:

receiving, by a receiving end, a second amplitude value, a second phase value, an amplitude quantization level, and a phase quantization level of a first I/Q signal that is sent by a sending end, where the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;

determining, by the receiving end, a first amplitude value of the first I/Q signal according to the second amplitude value and the amplitude quantization level, where the first amplitude value is an amplitude of the first I/Q signal before the quantization;

determining, by the receiving end, a first phase value of the first I/Q signal according to the second phase value and the phase quantization level, where the first phase value is a phase of the first I/Q signal before the quantization; and recovering, by the receiving end, the first I/Q signal according to the first amplitude value and the first phase value.

With reference to the second aspect, in a first possible implementation of the second aspect, the determining, by the receiving end, a first amplitude value of the first I/Q signal according to the second amplitude value and the amplitude quantization level includes:

querying, by the receiving end, a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and determining, by the sending end, a product of the second amplitude value and the amplitude quantization factor as the first amplitude value.

With reference to the second aspect, in a second possible implementation of the second aspect, the determining, by the receiving end, a first phase value of the first I/Q signal according to the second phase value and the phase quantization level includes:

querying, by the receiving end, a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and determining, by the sending end, a product of the second phase value and the phase quantization factor as the first phase value.

With reference to any one of the second aspect or the first or second possible implementation of the second aspect, in a third possible implementation of the second aspect, the receiving, by a receiving end, a second amplitude value, a second phase value, an amplitude quantization level, and a phase quantization level of a first I/Q signal that is sent by a sending end includes:

receiving, by the receiving end, the amplitude quantization level and the phase quantization level at a control word bit in the Common Public Radio Interface CPRI protocol, and receiving the second amplitude value and the second phase value at a data word bit in the CPRI protocol.

With reference to any one of the second aspect or the first to third possible implementations of the second aspect, in a fourth possible implementation of the second aspect, the recovering, by the receiving end, the first I/Q signal according to the first amplitude value and the first phase value includes:

recovering, by the receiving end by using an inverse operation of a coordinate rotation digital computer method, the first I/Q signal that is mapped to a first quadrant in a Cartesian coordinate system; and performing, by the receiving end, I/Q signal inverse mapping, and recovering the first I/Q signal from the first I/Q signal that is mapped to the first quadrant.

According to a third aspect, an embodiment of the present application provides a sending end, including:

a calculation unit, configured to calculate a first amplitude value and a first phase value of a first I/Q signal;

an obtaining unit, configured to obtain an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width;

a quantization unit, configured to: quantize the first amplitude value according to the amplitude quantization level, to obtain a second amplitude value after the quantization, and quantize the first phase value according to the phase quantization level, to obtain a second phase value after the quantization; and a sending unit, configured to transmit the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

With reference to the third aspect, in a first possible implementation of the third aspect, the obtaining unit is specifically configured to: determine a specified bit width for sending the first I/Q signal; determine a ratio of the first amplitude value to the specified bit width as the amplitude quantization level, and determine a ratio of the first phase value to the specified bit width as the phase quantization level.

With reference to the third aspect, in a second possible implementation of the third aspect, the obtaining unit is specifically configured to: determine a specified bit width for sending the first I/Q signal; determine a ratio of the maximum amplitude value to the specified bit width as the amplitude quantization level, and determine a ratio of the maximum phase value to the specified bit width as the phase quantization level; and the calculation unit is further configured to calculate a maximum amplitude value in amplitude values of N I/Q signals, and a maximum phase value in phase values of the N I/Q signals, where the first I/Q signal is any I/Q signal in an I/Q signal group that includes the N I/Q signals, and N>1.

With reference to any one of the third aspect or the first or second possible implementation of the third aspect, in a third possible implementation of the third aspect, the quantization unit is specifically configured to: query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and use a product of the first amplitude value and the amplitude quantization factor as the second amplitude value.

With reference to any one of the third aspect or the first or second possible implementation of the third aspect, in a fourth possible implementation of the third aspect, the quantization unit is specifically configured to: query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and use a product of the first phase value and the phase quantization factor as the second phase value.

With reference to any one of the third aspect or the first to fourth possible implementations of the third aspect, in a fifth possible implementation of the third aspect, the sending unit is specifically configured to: transmit the amplitude quantization level and the phase quantization level by using a control word bit in the Common Public Radio Interface CPRI protocol, and transmit the second amplitude value and the second phase value by using a data word bit in the CPRI protocol.

With reference to any one of the third aspect or the first to fifth possible implementations of the third aspect, in a sixth possible implementation of the third aspect, the calculation unit is specifically configured to: map the first I/Q signal to a first quadrant in a Cartesian coordinate system; and extract, by using a coordinate rotation digital computer method, the first amplitude value and the first phase value from the first I/Q signal after the mapping.

According to a fourth aspect, an embodiment of the present application provides a receiving end, including:

a receiving unit, configured to receive a second amplitude value, a second phase value, an amplitude quantization level, and a phase quantization level of a first I/Q signal that is sent by a sending end, where the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;

a determining unit, configured to: determine a first amplitude value of the first I/Q signal according to the second amplitude value and the amplitude quantization level, where the first amplitude value is an amplitude of the first I/Q signal before the quantization; and determine a first phase value of the first I/Q signal according to the second phase value and the phase quantization level, where the first phase value is a phase of the first I/Q signal before the quantization; and a recovering unit, configured to recover the first I/Q signal according to the first amplitude value and the first phase value.

With reference to the fourth aspect, in a first possible implementation of the fourth aspect, the determining unit is specifically configured to: query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and determine a product of the second amplitude value and the amplitude quantization factor as the first amplitude value.

With reference to the fourth aspect, in a second possible implementation of the fourth aspect, the determining unit is specifically configured to: query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and determine a product of the second phase value and the phase quantization factor as the first phase value.

With reference to any one of the fourth aspect or the first or second possible implementation of the fourth aspect, in a third possible implementation of the fourth aspect, the receiving unit is specifically configured to: receive the amplitude quantization level and the phase quantization level at a control word bit in the Common Public Radio Interface CPRI protocol, and receive the second amplitude value and the second phase value at a data word bit in the CPRI protocol.

With reference to any one of the fourth aspect or the first to third possible implementations of the fourth aspect, in a fourth possible implementation of the fourth aspect, the recovering unit is specifically configured to: recover, by using an inverse operation of a coordinate rotation digital computer method, the first I/Q signal that is mapped to a first quadrant in a Cartesian coordinate system; and perform I/Q signal inverse mapping, and recover the first I/Q signal from the first I/Q signal that is mapped to the first quadrant.

According to a fifth aspect, an embodiment of the present application provides a sending end, including a processor, and a calculator and a transceiver that are connected to the processor, where the calculator is configured to calculate a first amplitude value and a first phase value of a first I/Q signal;

the transceiver is configured to obtain an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width;

the processor is configured to: quantize the first amplitude value according to the amplitude quantization level, to obtain a second amplitude value after the quantization, and quantize the first phase value according to the phase quantization level, to obtain a second phase value after the quantization; and the transceiver is configured to transmit the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

With reference to the fifth aspect, in a first possible implementation of the fifth aspect, the processor is further configured to determine a specified bit width for sending the first I/Q signal; and the calculator is further configured to: determine a ratio of the first amplitude value to the specified bit width as the amplitude quantization level, and determine a ratio of the first phase value to the specified bit width as the phase quantization level.

With reference to the fifth aspect, in a second possible implementation of the fifth aspect, the processor is further configured to determine a specified bit width for sending the first I/Q signal; and the calculator is further configured to: calculate a maximum amplitude value in amplitude values of N I/Q signals, and a maximum phase value in phase values of the N I/Q signals, where the first I/Q signal is any I/Q signal in an I/Q signal group that includes the N I/Q signals, and N>1; and determine a ratio of the maximum amplitude value to the specified bit width as the amplitude quantization level, and determine a ratio of the maximum phase value to the specified bit width as the phase quantization level.

With reference to any one of the fifth aspect or the first or second possible implementation of the fifth aspect, in a third possible implementation of the fifth aspect, the processor is further configured to query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and the calculator is further configured to use a product of the first amplitude value and the amplitude quantization factor as the second amplitude value.

With reference to any one of the fifth aspect or the first or second possible implementation of the fifth aspect, in a fourth possible implementation of the fifth aspect, the processor is further configured to query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and the calculator is further configured to use a product of the first phase value and the phase quantization factor as the second phase value.

With reference to any one of the fifth aspect or the first to fourth possible implementations of the fifth aspect, in a fifth possible implementation of the fifth aspect, the transceiver is further configured to: transmit the amplitude quantization level and the phase quantization level by using a control word bit in the Common Public Radio Interface CPRI protocol, and transmit the second amplitude value and the second phase value by using a data word bit in the CPRI protocol.

With reference to any one of the fifth aspect or the first to fifth possible implementations of the fifth aspect, in a sixth possible implementation of the fifth aspect, the calculator is further configured to: map the first I/Q signal to a first quadrant in a Cartesian coordinate system; and extract, by using a coordinate rotation digital computer method, the first amplitude value and the first phase value from the first I/Q signal after the mapping.

According to a sixth aspect, an embodiment of the present application provides a receiving end, including a processor, and a transceiver and a calculator that are connected to the processor, where the transceiver is configured to receive a second amplitude value, a second phase value, an amplitude quantization level, and a phase quantization level of a first I/Q signal that is sent by a sending end, where the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;

the processor is configured to: determine a first amplitude value of the first I/Q signal according to the second amplitude value and the amplitude quantization level, where the first amplitude value is an amplitude of the first I/Q signal before the quantization; and determine a first phase value of the first I/Q signal according to the second phase value and the phase quantization level, where the first phase value is a phase of the first I/Q signal before the quantization; and the calculator is configured to recover the first I/Q signal according to the first amplitude value and the first phase value.

With reference to the sixth aspect, in a first possible implementation of the sixth aspect, the processor is further configured to query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and the calculator is further configured to determine a product of the second amplitude value and the amplitude quantization factor as the first amplitude value.

With reference to the sixth aspect, in a second possible implementation of the sixth aspect, the processor is further configured to query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and the calculator is further configured to determine a product of the second phase value and the phase quantization factor as the first phase value.

With reference to any one of the sixth aspect or the first or second possible implementation of the sixth aspect, in a third possible implementation of the sixth aspect, the transceiver is further configured to: receive the amplitude quantization level and the phase quantization level at a control word bit in the Common Public Radio Interface CPRI protocol, and receive the second amplitude value and the second phase value at a data word bit in the CPRI protocol.

With reference to any one of the sixth aspect or the first to third possible implementations of the sixth aspect, in a fourth possible implementation of the sixth aspect, the calculator is further configured to: recover, by using an inverse operation of a coordinate rotation digital computer method, the first I/Q signal that is mapped to a first quadrant in a Cartesian coordinate system; and perform I/Q signal inverse mapping, and recover the first I/Q signal from the first I/Q signal that is mapped to the first quadrant.

According to a seventh aspect, an embodiment of the present application provides an I/Q signal transmission system, including the sending end according to any possible implementation of the third aspect, and the receiving end according to any possible implementation of the fourth aspect; or including the sending end according to any possible implementation of the fifth aspect, and the receiving end according to any possible implementation of the sixth aspect.

Embodiments of the present application provide an I/Q signal transmission method and system, and an apparatus. A sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to a receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application, an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features. In the description of the present application, "multiple" means two or more than two, unless otherwise specified.

Embodiment 1

Figure 1:
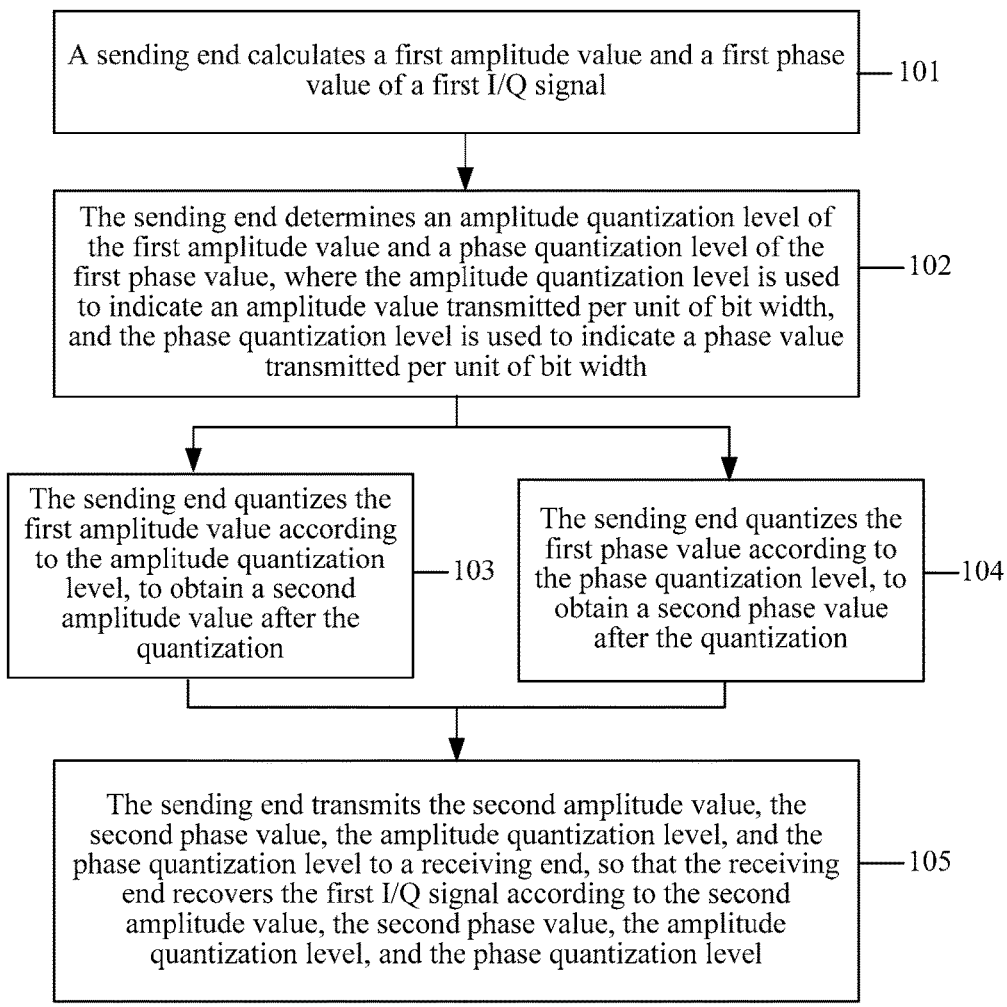
FIG. 1 is a schematic flowchart 1 of an I/Q signal transmission method according to an embodiment of the present application.

An embodiment of the present application provides an I/Q signal transmission method. As shown in FIG. 1, the method includes the following steps:

101: A sending end calculates a first amplitude value and a first phase value of a first I/Q signal.

102: The sending end determines an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width.

103: The sending end quantizes the first amplitude value according to the amplitude quantization level, to obtain a second amplitude value after the quantization.

104: The sending end quantizes the first phase value according to the phase quantization level, to obtain a second phase value after the quantization.

105: The sending end transmits the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

Specifically, this embodiment of the present application may be applied to any communications system that is based on I/Q signal transmission, such as I/Q signal transmission between base stations or I/Q signal transmission between chips that is in a wireless communications system. This is not limited in the present application.

In step 101, when sending the to-be-sent first I/Q signal to the receiving end, the sending end may effectively compress the first I/Q signal, to increase efficiency of transmission between the sending end and the receiving end. To avoid a problem in the prior art such as signal distortion due to direct bit width compression on the first I/Q signal by using different algorithms, in the embodiment provided in the present application, the sending end may first calculate the first amplitude value and the first phase value of the to-be-sent first I/Q signal, so that subsequently the sending end quantizes and transmits the first I/Q signal according to the first amplitude value and the first phase value.

Specifically, in a Cartesian coordinate system, an I value, that is, an in-phase component, of the first I/Q signal may be indicated by using the x-axis, and a Q value, that is, a phase shift component, of the first I/Q signal may be indicated by using the y-axis. Therefore, the first I/Q signal indicated in the Cartesian coordinate system may be converted into polar coordinates in a polar coordinate system, that is, converted into the first amplitude value and the first phase value of the first I/Q signal. That is, the first I/Q signal is switched from a time-domain space into vector space, and then the first amplitude value and the first phase value of the first I/Q signal are obtained.

For example, the sending end may first map the first I/Q signal to a first quadrant of the Cartesian coordinate system, and then use a coordinate rotation digital computer method (such as a Cordic algorithm) to calculate an amplitude and a phase of the first I/Q signal after the mapping, that is, the first amplitude value and the first phase value of the first I/Q signal.

In step 102, after the sending end obtains the first amplitude value and the first phase value of the first I/Q signal, an uncompressed bit width of the first I/Q signal is relatively large. Therefore, the first amplitude value and the first phase value are also relatively large, and a bit width occupied to directly transmit the first amplitude value and the first phase value to the receiving end is relatively large. Therefore, the sending end may determine the amplitude quantization level of the first amplitude value and the phase quantization level of the first phase value, and then quantize the first amplitude value and the first phase value, to reduce a transmission bit width, and increase the transmission efficiency of the sending end and the receiving end.

The amplitude quantization level is used to indicate an amplitude value transmitted per unit of bit width, and the phase quantization level is used to indicate a phase value transmitted per unit of bit width.

For example, transmission of the first amplitude value and the first phase value of the first I/Q signal needs to occupy a bit width of eight bits, and a receiving and sending bit width agreed on by the sending end and the receiving end is five bits. Therefore, the sending end may separately determine the amplitude quantization level of the first amplitude value and the phase quantization level of the first phase value, and then quantize the first amplitude value and the first phase value, to obtain the amplitude value and the phase value that are after the quantization and that have a bit width size meeting a requirement of five bits.

For example, the first amplitude value of the first I/Q signal is 125, and needs to be transmitted by using a bit width of seven bits (a bit is a minimum data unit in a computer, and one bit is a single binary numerical value 0 or 1; therefore X bits may indicate any decimal number between 1 and $2^X$). In this case, the sending end may obtain the amplitude quantization level of the first amplitude value, that is, the amplitude value transmitted per unit of bit width. For example, the first amplitude value is 125, a specified bit width for transmitting the first I/Q signal is five bits, and then it may be specified that the amplitude quantization level of the first amplitude $$\text{value} = \left[\frac{125}{2^5}\right] = 4,$$

that is, in the transmission bit width of five bits, the amplitude value transmitted per unit of bit width is 4. In this way, the sending end may quantize the first amplitude value according to the amplitude quantization level.

[Z] (Z is any real number) is a rounding function. When the amplitude quantization level or the phase quantization level is calculated, it is possible that exact division cannot be made. Therefore, it may be stipulated that a value of the amplitude quantization level or the phase quantization level is rounded up or rounded down. Certainly, a calculation precision for calculating the amplitude quantization level or the phase quantization level may be stipulated in advance. For example, it is stipulated in advance that a calculation precision for calculating the amplitude quantization level of the first amplitude value is 0.1, and then the amplitude quantization level of the first amplitude $$\text{value} = \frac{125}{2^5} \approx 3.9.$$

A person skilled in the art may set the calculation precision for the amplitude quantization level or the phase quantization level according to an actual situation. This is not limited in the present application.

Similarly, the sending end may further obtain the phase quantization level of the first phase value, that is, a size of the bit width occupied per unit of phase value. It should be noted that, the amplitude quantization level of the first amplitude value and the phase quantization level of the first phase value may be pre-stored in the sending end, or may be obtained by the sending end according to the first amplitude value and the first amplitude value by using a specified algorithm. This is not limited in the present application.

It should be noted that, in the amplitude quantization level or the phase quantization level that is defined in this embodiment of the present application, the unit of bit width is not limited to a transmission bit width of one bit. A person skilled in the art may set the amplitude quantization level and the phase quantization level according to actual experience or a particular algorithm. For example, the specified bit width for transmitting the first I/Q signal is determined by the sending end and the receiving end in advance (that is, in the formula of the amplitude quantization level, the specified bit width used as the denominator is invariant). Therefore, the maximum amplitude value may be directly used as a quantization level.

In step 103, after obtaining the amplitude quantization level in step 102, the sending end may quantize the first amplitude value according to the amplitude quantization level, to obtain the second amplitude value after the quantization.

The example in step 102 is still used for description. The amplitude quantization level of the first amplitude $$\text{value} = \left[\frac{125}{2^5}\right] = 4,$$

that is, in the transmission bit width of five bits, the amplitude value transmitted per unit of bit width is 4. Therefore, the second amplitude value obtained after the quantization of the first amplitude value is [125 (the first amplitude value)/4]=32. It can be learned that, after the quantization, transmission of the second amplitude value needs a bit width of only five bits.

Similar to step 103, in step 104, after obtaining the phase quantization level in step 102, the sending end may also quantize the first phase value according to the phase quantization level, to obtain the second phase value after the quantization.

In this way, the sending end separately quantizes the first amplitude value and the first phase value of the first I/Q signal according to the amplitude quantization level and the phase quantization level that are determined, so that the second amplitude value and the second phase value after the quantization meet a requirement on the bit width for transmitting the first I/Q signal. In addition, in a quantization process, the first amplitude value and the first phase value are only increased or decreased in vector space according to a scale, and the bit width of the first I/Q signal is not directly compressed, and therefore accuracy of the first I/Q signal in a transmission process is ensured.

In step 105, the second amplitude value and the second phase value that are obtained in step 104 meet the requirement on the bit width for transmitting the first I/Q signal. Therefore, in this case, the sending end may perform data packing on the second amplitude value, the second phase value, as well as the amplitude quantization level and the phase quantization level in step 102, and transmit them to the receiving end. In this way, the receiving end may recover the first I/Q signal according to the second amplitude value, the second phase value, the amplitude quantization level, and the phase quantization level.

The examples in step 102 to step 104 are still used for description. The sending end sends the second amplitude value (32) and the amplitude quantization level (4) to the receiving end, and then the receiving end may perform inverse quantization according to the second amplitude value (32) and the amplitude quantization level (4), to obtain, by means of an inverse solution, that the first amplitude value of the first I/Q signal before the quantization=32 (the second amplitude value)*4 (the amplitude quantization level)=128. Similarly, the sending end may also obtain the first phase value of the first I/Q signal before the quantization, and then relatively accurately recover the first I/Q signal. It can be learned that, because values of calculation precision are different, there is an error between a value of first I/Q signal recovered by the receiving end and a value of first I/Q signal sent by the sending end. When value precision is sufficiently high, the receiving end may more precisely recover the first I/Q signal that is before the quantization.

Figure 2:
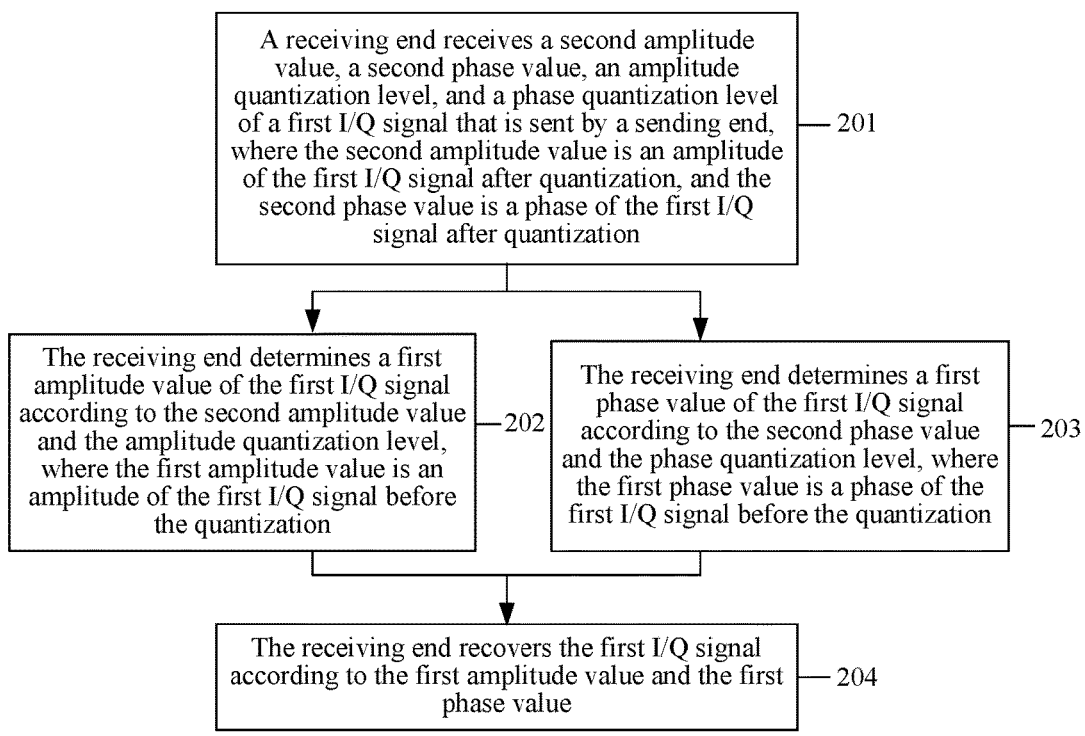
FIG. 2 is a schematic flowchart 2 of an I/Q signal transmission method according to an embodiment of the present application.

An embodiment of the present application provides an I/Q signal transmission method. As shown in FIG. 2, the method includes the following steps:

201: A receiving end receives a second amplitude value, a second phase value, an amplitude quantization level, and a phase quantization level of a first I/Q signal that is sent by a sending end, where the second amplitude value is an amplitude of the first I/Q signal after quantization, and the second phase value is a phase of the first I/Q signal after quantization.

202: The receiving end determines a first amplitude value of the first I/Q signal according to the second amplitude value and the amplitude quantization level, where the first amplitude value is an amplitude of the first I/Q signal before the quantization.

203: The receiving end determines a first phase value of the first I/Q signal according to the second phase value and the phase quantization level, where the first phase value is a phase of the first I/Q signal before the quantization.

204: The receiving end recovers the first I/Q signal according to the first amplitude value and the first phase value.

In step 101 to step 105, the sending end calculates the first amplitude value and the first phase value of the to-be-sent first I/Q signal, quantizes the first amplitude value and the first phase value according to the amplitude quantization level and the phase quantization level that are determined, and then sends the amplitude quantization level, the phase quantization level, the second amplitude value after the quantization, and the second phase value after the quantization to the receiving end according to the specified bit width that is required, so that the receiving end recovers the first I/Q signal.

Specifically, in step 201, the receiving end may receive the second amplitude value, the second phase value, the amplitude quantization level, and the phase quantization level of the first I/Q signal that are sent by the sending end in step 105.

The second amplitude value is an amplitude of the first I/Q signal after the quantization, the second phase value is a phase of the first I/Q signal after the quantization, the amplitude quantization level is used to indicate an amplitude value transmitted per unit of bit width, and the phase quantization level is used to indicate a phase value transmitted per unit of bit width (specifically, refer to the description related to the amplitude quantization level and the phase quantization level in step 102).

It should be noted that, interaction may be performed between the receiving end and the sending end based on the CPRI (Common Public Radio Interface) protocol or the IR (infrared, infrared communication) protocol. This is not limited in the present application.

In step 202, the amplitude quantization level is used to indicate the amplitude value transmitted per unit of bit width, and the second amplitude value is the amplitude value of the first I/Q signal after the quantization. Therefore, the receiving end may calculate a first amplitude value of the first I/Q signal before the quantization. The first amplitude value=the second amplitude value*the amplitude quantization level.

Similar to step 202, in step 203, the phase quantization level is used to indicate the phase value transmitted per unit of bit width, and the second phase value is the phase value of the first I/Q signal after the quantization. Therefore, the receiving end may calculate a first phase value of the first I/Q signal before the quantization according to the second phase value and the phase quantization level. The first phase value=the second phase value*the phase quantization level.

Certainly, a method for quantizing the first amplitude value and the first phase value by the sending end, and a method for recovering from quantization of the second amplitude value and the second phase value by the receiving end are not limited to step 101 to step 105 and step 201 to step 203. For example, the first phase value of the first I/Q signal is always within an interval of 0 to $2\pi$, and therefore it may be stipulated in advance that the phase quantization level of the first phase value is fixed value quantization.

In step 204, the first amplitude value and the first phase value are an amplitude value and a phase value of the first I/Q signal before the quantization. Therefore, by using an inverse operation of a Cordic algorithm, the receiving end may recover the first I/Q signal according to the first amplitude value obtained in step 202 and the first phase value obtained in step 203.

This embodiment of the present application provides an I/Q signal transmission method. A sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to a receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application, an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

Embodiment 2

Figure 3:
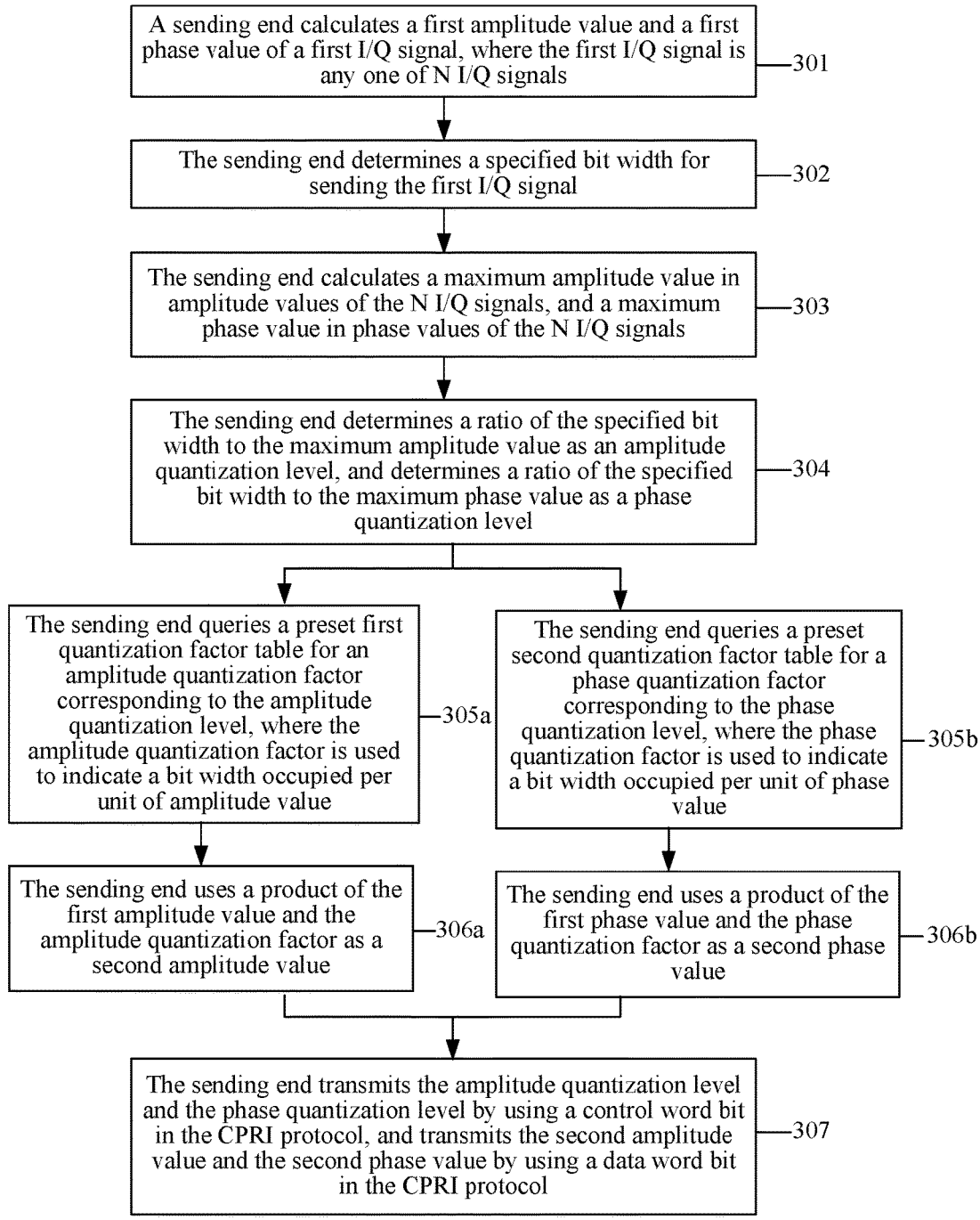
FIG. 3 is a schematic flowchart 3 of an I/Q signal transmission method according to an embodiment of the present application.

An I/Q signal is a signal in time-domain space. Therefore, by means of an I/Q signal transmission method provided in an embodiment of the present application, N ((N>1)) I/Q signals within a T (T>0 s) time can be quantized and transmitted as a signal group. In this way, according to I/Q signals in different signal groups, an amplitude quantization level and a phase quantization level that are corresponding to each signal group can be adjusted in real time, and therefore I/Q signal transmission precision is increased. As shown in FIG. 3, the method includes the following steps:

301: A sending end calculates a first amplitude value and a first phase value of a first I/Q signal, where the first I/Q signal is any one of N I/Q signals.

302: The sending end determines a specified bit width for sending the first I/Q signal.

303: The sending end calculates a maximum amplitude value in amplitude values of the N I/Q signals, and a maximum phase value in phase values of the N I/Q signals.

304: The sending end determines a ratio of the maximum magnitude value to the specified bit width as an amplitude quantization level, and determines a ratio of the maximum phase value to the specified bit width as a phase quantization level.

305a: The sending end queries a preset first quantization factor table for an amplitude quantization factor corresponding to the amplitude quantization level, where the amplitude quantization factor is used to indicate a bit width occupied per unit of amplitude value.

306a: The sending end uses a product of the first amplitude value and the amplitude quantization factor as a second amplitude value.

305b: The sending end queries a preset second quantization factor table for a phase quantization factor corresponding to the phase quantization level, where the phase quantization factor is used to indicate a bit width occupied per unit of phase value.

306b: The sending end uses a product of the first phase value and the phase quantization factor as a second phase value.

307: The sending end transmits the amplitude quantization level and the phase quantization level by using a control word bit in the CPRI protocol, and transmits the second amplitude value and the second phase value by using a data word bit in the CPRI protocol.

In step 301, the sending end calculates the first amplitude value and the first phase value of the first I/Q signal. The first I/Q signal is any one of the N I/Q signals.

Specifically, the sending end may first map the first I/Q signal to a first quadrant of a Cartesian coordinate system, and then use a Cordic algorithm to calculate an amplitude and a phase of the first I/Q signal after the mapping, that is, the first amplitude value and the first phase value of the first I/Q signal.

In this way, the sending end may calculate a first amplitude value and a first phase value of each I/Q signal of the N I/Q signals in a signal group. For example, in a signal group, there are a total of four I/Q signals, that is, A, B, C, and D, and then first amplitude values and first phase values of the four I/Q signals can be obtained respectively, for example, A (125, 60°), B (63, 180°), C (32, 30°), and D (16, 55°).

In step 302, to meet a requirement on a bit width for sending the first I/Q signal, the sending end needs to quantize the first amplitude value and the first phase value that are obtained in step 301. Therefore, the sending end may determine the specified bit width for sending the first I/Q signal, and then calculate and quantize the amplitude quantization level of the first amplitude value and quantize the phase quantization level of the first phase value.

The specified bit width for sending the first I/Q signal may be configured by the sending end in advance. Usually, efficiency of transmission between the sending end and the receiving end needs to be increased by reducing a transmission bit width. Therefore, an actual specified bit width for sending the first I/Q signal is less than a bit width of the first I/Q signal. For example, the first I/Q signal occupies a bit width of eight bits, and the specified bit width for sending the first I/Q signal may be five bits.

In step 303, after determining the specified bit width for sending the first I/Q signal, the sending end calculates the maximum amplitude value in the amplitude values of the N I/Q signals, and the maximum phase value in the phase values of the N I/Q signals.

The examples in step 301 and step 302 are still used for description. The first amplitude values and the first phase values of the four I/Q signals in the signal group are respectively: A (125, 60°), B (63, 180°), C (32, 30°), and D (16, 55°). Therefore, the maximum amplitude value in the amplitude values of the N I/Q signals is 125, and the maximum amplitude value in the amplitude values of the N I/Q signals is 180°.

In this way, in step 304, the sending end may determine, according to the specified bit width obtained in step 302 and the maximum amplitude value and the maximum phase value that are obtained in step 303, an amplitude quantization level and a phase quantization level that are used when the N I/Q signals in the signal group are quantized. The amplitude quantization level is used to indicate an amplitude value transmitted per unit of bit width, and the phase quantization level is used to indicate a phase value transmitted per unit of bit width.

Specifically, the sending end may determine the ratio of the specified bit width to the maximum amplitude value as the amplitude quantization level, and determine the ratio of the specified bit width to the maximum phase value as the phase quantization level.

The examples in step 301 to step 303 are still used for description. The amplitude quantization level used in the signal group=the ratio of the maximum amplitude value to the specified bit $$\text{width} = \left[\frac{125}{2^5}\right] = 4.$$

The phase quantization level used in the signal group=the ratio of the maximum phase value to the specified bit $$\text{width} = \frac{180}{2^5} = 5.625.$$

In this way, an amplitude quantization level and a phase quantization level when each I/Q signal in the signal group is quantized can be determined.

It should be noted that, to ensure that in the N I/Q signals, a signal whose amplitude value is maximum or whose phase value is maximum can be transmitted in the specified bit width, and also ensure quantization precision, the ratio of the specified bit width to the maximum amplitude value is used as the amplitude quantization level when the amplitude quantization level is calculated. However, it should be clarified that, the amplitude quantization level may further be a ratio of any K value to the specified bit width. When K is less than the maximum amplitude value, it cannot be ensured that the signal whose amplitude value is maximum is transmitted in the specified bit width. However, when K is far greater than the maximum amplitude value, the quantization precision may be reduced, causing signal distortion. Similarly, when the phase quantization level is calculated, a ratio of any J value to the specified bit width may also be used as the phase quantization level.

Alternatively, the specified bit width is determined by the sending end and the receiving end in advance (that is, in the formula of the amplitude quantization level, the specified bit width used as the denominator is invariant). Therefore, the maximum amplitude value may be directly used as a quantization level. Then, after obtaining the maximum amplitude value, the sending end may determine the amplitude quantization level that is used when the N I/Q signals in the signal group are quantized. Similarly, after obtaining the maximum phase value, the sending end may determine the phase quantization level that is used when the N I/Q signals in the signal group are quantized.

Certainly, the first phase value of the first I/Q signal is always within an interval of 0 to 2π. Therefore, it may be stipulated in advance that, the phase quantization level of the first phase value is 2π, to quantize the first phase value.

In step 305a and step 306a, the sending end quantizes the first amplitude value according to the amplitude quantization level, to obtain the second amplitude value after the quantization. In step 305b and step 306b, the sending end quantizes the first phase value according to the phase quantization level, to obtain the second phase value after the quantization.

Specifically, in step 305a, the first quantization factor table is preset in the sending end. The first quantization factor table stores a correspondence between amplitude quantization levels and amplitude quantization factors, as shown in Table 1. The sending end may query, according to the first quantization factor table, an amplitude quantization factor corresponding to an amplitude quantization level. The amplitude quantization factor is used to indicate the bit width occupied per unit of amplitude value. For example, the amplitude quantization factor may be a reciprocal of an amplitude quantization level corresponding to the amplitude quantization factor. For example, when the amplitude quantization level is 4, an amplitude quantization factor corresponding to the amplitude quantization level is a reciprocal of 4, that is, 0.25.

TABLE 1

| Amplitude quantization level | Amplitude quantization factor |
|---|---|
| 4 | 0.25 |
| 3 | 0.33 |
| . . . | . . . |

Certainly, the amplitude quantization factor shown in Table 1 may not be a reciprocal of an amplitude quantization level corresponding to the amplitude quantization factor. For example, when the amplitude quantization level is the maximum amplitude value in the amplitude values of the N I/Q signals that are obtained in step 303, the amplitude quantization factor may be a ratio of the specified bit width to the maximum amplitude value. Alternatively, a person skilled in the art may set amplitude quantization factors corresponding to different amplitude quantization levels according to actual experience or a particular algorithm. This is not limited in this embodiment of the present application.

In step 306a, the amplitude quantization factor obtained in step 305a is used to indicate a bit width occupied per unit of amplitude value. Therefore, the sending end quantizes the first amplitude value obtained in step 301, to obtain the second amplitude value. The second amplitude value=the first amplitude value*the amplitude quantization factor.

In this way, the sending end may separately calculate second amplitude values of N I/Q signals in a signal group after the quantization. The examples in step 301 to step 305a are still used for description. In a signal group, there are a total of four I/Q signals, that is, A, B, C, and D. A second amplitude value (A)=the first amplitude value*the amplitude quantization factor=125*0.25=32, a second amplitude value (B)=the first amplitude value*the amplitude quantization factor=63*0.25=16, a second amplitude value (C)=the first amplitude value*the amplitude quantization factor=32*0.25=8, and a second amplitude value (D)=the first amplitude value*the amplitude quantization factor=16*0.25=4. It can be learned that, N second amplitude values after the quantization all meet a requirement of the specified bit width (five bits), and additionally, a quantization error that may be caused in a quantization process is far less than an error that is brought about by a signal loss caused by direct bit width compression of an I/Q signal in the prior art.

Similar to step 305a and step 306a, in step 305b and step 306b, the sending end queries the preset second quantization factor table for a phase quantization factor corresponding to a phase quantization level. The second quantization factor table stores the correspondence between phase quantization levels and phase quantization factors. The phase quantization factor is used to indicate the phase value transmitted per unit of bit width. Then, the sending end uses the ratio of the first phase value to the phase quantization factor as the second phase value, to complete quantization of the first phase value.

In step 307, the sending end transmits the amplitude quantization level and the phase quantization level by using the control word bit in the CPRI protocol, and transmits the second amplitude value and the second phase value by using the data word bit in the CPRI protocol.

The CPRI protocol is a general specification for transmitting a base-band signal in a digital manner. It defines an interface relationship between an REC (radio equipment control) and RE (radio equipment). An REC or RE in the sending end may interact with an REC or RE in the receiving end by using the protocol.

Specifically, the CPRI protocol includes a control word bit (that is, a control plane of the CPRI protocol) and a data word bit (that is, a data plane of the CPRI protocol). To reduce the bit width for transmitting the first I/Q signal, the sending end inserts the transmission amplitude quantization level and phase quantization level that are used during the quantization into a fixed control word bit to perform transmission, and transmits, by using a data word bit, the second amplitude value and the second phase value after the quantization to the receiving end. In this way, the first I/Q signal after the quantization can be transmitted without occupying excessive data word bits.

In addition, the amplitude quantization factor and the phase quantization factor may also be inserted into the fixed control word bit, to be transmitted in replacement of the amplitude quantization level and the phase quantization level. In this case, the amplitude quantization factor and the phase quantization factor are usually decimals less than 1. To ensure precision of recovering the first I/Q signal by the sending end, relatively many control word bits need to be occupied. Alternatively, the maximum amplitude value and the maximum phase value that are obtained in step 303 may be inserted into the fixed control word bit, to be transmitted in replacement of the amplitude quantization level and the phase quantization level. The sending end has determined the specified bit width for transmitting the first I/Q signal, and therefore the sending end may calculate the amplitude quantization level and the phase quantization level according to the maximum amplitude value and the maximum phase value.

As shown in Table 2, C0 to CN indicate N control word bits in a CPRI data stream, and D indicates a data word bit in the CPRI data stream. When N I/Q signals in one signal group are transmitted, a same transmission amplitude quantization level and a same phase quantization level are used when the N I/Q signals are quantized. Therefore, a uniform transmission amplitude quantization level and a uniform phase quantization level of the N I/Q signals may be inserted into several fixed control word bits (for example, the first bit to the fourth bit in C0), and a second amplitude value and a second phase value of each I/Q signal of the N I/Q signals after the quantization may be framed into several data word bits D.

TABLE 2

| C0 | D | C1 | D | ... | CN | D | ... |
|----|---|----|----|-----|----|----|-----|

In this way, when the sending end sends an I/Q signal to the receiving end, the sending end switches the I/Q signal into vector space to quantize an amplitude and a phase of the I/Q signal. When it is ensured that signal transmission is performed in the specified bit width, a problem in the prior art that some signals are lost when bit width compression is directly performed on I/Q signals is avoided.

In addition, the steps shown in FIG. 3 are only examples for description. For ease of description, the steps are described as a series of action combinations, but a person skilled in the art should know that, the present application is not limited by a sequence of described actions, and secondly, a person skilled in the art should also know that, the embodiments described in the specification are embodiments, and the used actions are not necessarily needed by the embodiments of the present application.

Figure 4:
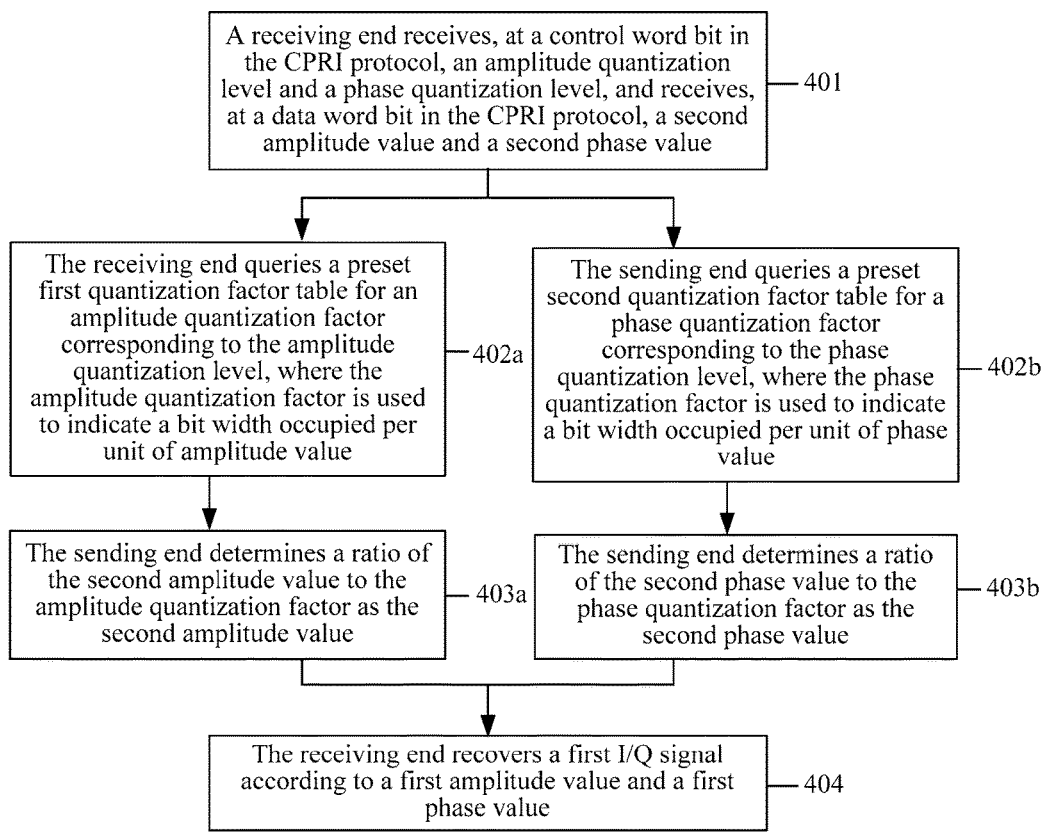
FIG. 4 is a schematic flowchart 4 of an I/Q signal transmission method according to an embodiment of the present application.

Corresponding to step 301 to step 307, after the sending end sends, to the receiving end, second amplitude values and second phase values of N I/Q signals in one signal group after the quantization, as well as the transmission amplitude quantization level and phase quantization level that are used during the quantization, the receiving end needs to perform an inverse operation of step 301 to step 307, to accurately recover each I/Q signal in the signal group before the quantization in the sending end. For example, as shown in FIG. 4, an embodiment of the present application provides an I/Q signal transmission method, including the following steps:

401: A receiving end receives, at a control word bit in the CPRI protocol, an amplitude quantization level and a phase quantization level, and receives, at a data word bit in the CPRI protocol, a second amplitude value and a second phase value.

402a: The receiving end queries a preset first quantization factor table for an amplitude quantization factor corresponding to the amplitude quantization level, where the amplitude quantization factor is used to indicate a bit width occupied per unit of amplitude value.

403a: A sending end determines a ratio of the second amplitude value to the amplitude quantization factor as the first amplitude value.

402b: The receiving end queries a preset second quantization factor table for a phase quantization factor corresponding to the phase quantization level, where the phase quantization factor is used to indicate a bit width occupied per unit of phase value.

403b: The sending end determines a ratio of the second phase value to the phase quantization factor as the first phase value.

404: The receiving end recovers a first I/Q signal according to the first amplitude value and the first phase value.

In step 401, the sending end transmits the amplitude quantization level and the phase quantization level by using the control word bit in the CPRI protocol, and transmits the second amplitude value and the second phase value by using the data word bit in the CPRI protocol. Therefore, the receiving end may receive, in the corresponding control word bit in the CPRI protocol, the amplitude quantization level and the phase quantization level, and receive, in the data word bit in the CPRI protocol, the second amplitude value and the second phase value.

Specifically, refer to Table 2 and the corresponding description in step 307. The receiving end may parse out, in the control word bit (for example, the first bit to the fourth bit in C0), an amplitude quantization level and a phase quantization level that are used for quantizing the N I/Q signals, and obtain, in the data word bit D, a second amplitude value and a second phase value of each I/Q signal of the N I/Q signals after the quantization.

Then, in step 402a and step 403a, the receiving end determines, according to the amplitude quantization level and the second amplitude value that is after the quantization, the first amplitude value before the quantization. In step 402b and step 403b, the receiving end determines, according to the phase quantization level and the second phase value that is after the quantization, the first phase value before the quantization.

In step 402a, the receiving end queries the preset first quantization factor table for the amplitude quantization factor corresponding to the amplitude quantization level, where the amplitude quantization factor is used to indicate the bit width occupied per unit of amplitude value.

Refer to step 305a and Table 1. The first quantization factor table stores a correspondence between amplitude quantization levels and amplitude quantization factors. The amplitude quantization factor may be a reciprocal of an amplitude quantization level corresponding to the amplitude quantization factor.

In step 403a, the receiving end determines, according to the amplitude quantization factor obtained in step 402a, the ratio of the second amplitude value to the amplitude quantization factor as the first amplitude value of the first I/Q signal before the quantization, that is, the first amplitude value=the second amplitude value/the amplitude quantization factor.

In this way, the receiving end may calculate, according to the amplitude quantization factor obtained in step 402a, a first amplitude value of each I/Q signal of N I/Q signals in one signal group before the quantization.

Similarly, in step 402b, the receiving end queries the preset second quantization factor table for the phase quantization factor corresponding to the phase quantization level. The phase quantization factor is used to indicate the bit width occupied per unit of phase value.

In step 403b, the receiving end determines, according to the phase quantization factor obtained in step 402b, the ratio of the second phase value to the phase quantization factor as the first phase value of the first I/Q signal before the quantization, that is, the first phase value=the second phase value/the phase quantization factor.

In this way, the receiving end may calculate, according to the phase quantization factor obtained in step 402b, a first phase value of each I/Q signal of N I/Q signals in one signal group before the quantization.

It can be learned that, by means of steps 402a and 403a and steps 402b and 403b, the receiving end performs an inverse quantization operation on the received second amplitude value and second phase value after the quantization. An error of calculating, by the receiving end, the first phase value and the first amplitude value mainly comes from rounding of a calculation result. Therefore, the error generated in the process is very small. That is, the first phase value and the first amplitude value that are determined by the receiving end by means of steps 402a and 403a and steps 402b and 403b are almost the same as the first phase value and the first amplitude value that are obtained by the sending end in step 301. Therefore, the receiving end may relatively accurately recover each I/Q signal of the N I/Q signals sent by the sending end, reducing signal distortion cases.

In step 404, the receiving end may recover the first I/Q signal according to the first amplitude value and the first phase value that are determined in step 403a and step 403b. For example, the receiving end may use an inverse algorithm of a Cordic algorithm to recover a mapping status of the first I/Q signal in a first quadrant of a Cartesian coordinate system, and then perform an inverse mapping operation to recover the first I/Q signal that is before the mapping.

By means of the foregoing method, the receiving end may recover each I/Q signal of N I/Q signals in one signal group, to complete a transmission process of the N I/Q signals.

Compared with a solution of directly performing bit width compression on an I/Q signal to transmit the I/Q signal in the prior art, in a scenario of a same bit width compression ratio, this embodiment of the present application provides an I/Q signal transmission method that can greatly reduce an EVM (error vector magnitude). The EVM specifically indicates a degree of how close an I/Q component generated when the receiving end demodulates the I/Q signal is to an ideal signal component, and is an indicator for examining quality of a modulated signal. For example, using an example in which four-carrier LTE (Long Term Evolution) signals with a bandwidth of 20 M are transmitted at 1.25 G, in a scenario of 4:1 bit width compression, in an I/Q signal transmission method provided in this embodiment of the present application, the EVM indicator is approximately 30% lower than that in the conventional algorithm.

In addition, the steps shown in FIG. 4 are only examples for description. For ease of description, the steps are described as a series of action combinations, but a person skilled in the art should know that, the present application is not limited by a sequence of described actions, and secondly, a person skilled in the art should also know that, the embodiments described in the specification are preferred embodiments, and the used actions are not necessarily needed by the embodiments of the present application.

This embodiment of the present application provides an I/Q signal transmission method. A sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to a receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application. an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

Embodiment 3

Figure 5:
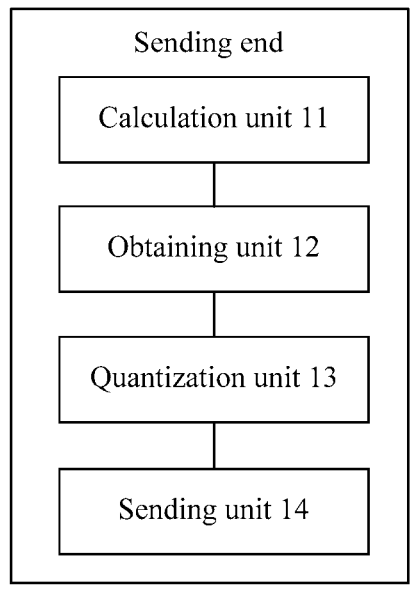
FIG. 5 is a schematic structural diagram of a sending end according to an embodiment of the present application.

An embodiment of the present application provides a sending end. As shown in FIG. 5, the sending end includes:

a calculation unit 11, configured to calculate a first amplitude value and a first phase value of a first I/Q signal;

an obtaining unit 12, configured to obtain an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width;

a quantization unit 13, configured to: quantize the first amplitude value according to the amplitude quantization level, to obtain a second amplitude value after the quantization, and quantize the first phase value according to the phase quantization level, to obtain a second phase value after the quantization; and a sending unit 14, configured to transmit the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

Further, the obtaining unit 12 is specifically configured to: determine a specified bit width for sending the first I/Q signal; determine a ratio of the first amplitude value to the specified bit width as the amplitude quantization level, and determine a ratio of the first phase value to the specified bit width as the phase quantization level.

Further, the obtaining unit 12 is specifically configured to: determine a specified bit width for sending the first I/Q signal; determine a ratio of the maximum amplitude value to the specified bit width as the amplitude quantization level, and determine a ratio of the maximum phase value to the specified bit width as the phase quantization level; and the calculation unit 11 is further configured to calculate a maximum amplitude value in amplitude values of N I/Q signals, and a maximum phase value in phase values of the N I/Q signals, where the first I/Q signal is any I/Q signal in an I/Q signal group that includes the N I/Q signals, and N>1.

Further, the quantization unit 13 is specifically configured to: query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and use a product of the first amplitude value and the amplitude quantization factor as the second amplitude value.

Further, the quantization unit 13 is specifically configured to: query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and use a product of the first phase value and the phase quantization factor as the second phase value.

Further, the sending unit 14 is specifically configured to: transmit the amplitude quantization level and the phase quantization level by using a control word bit in the Common Public Radio Interface CPRI protocol, and transmit the second amplitude value and the second phase value by using a data word bit in the CPRI protocol.

Further, the calculation unit 11 is specifically configured to: map the first I/Q signal to a first quadrant in a Cartesian coordinate system; and extract, by using a coordinate rotation digital computer method, the first amplitude value and the first phase value from the first I/Q signal after the mapping.

Figure 6:
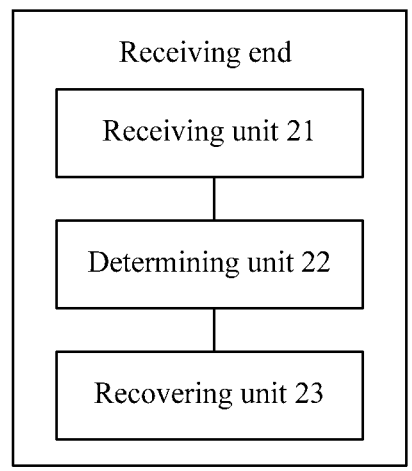
FIG. 6 is a schematic structural diagram of a receiving end according to an embodiment of the present application.

An embodiment of the present application provides a receiving end. As shown in FIG. 6, the receiving end includes:

a receiving unit 21, configured to receive a second amplitude value, a second phase value, an amplitude quantization level, and a phase quantization level of a first I/Q signal that is sent by a sending end, where the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;

a determining unit 22, configured to: determine a first amplitude value of the first I/Q signal according to the second amplitude value and the amplitude quantization level, where the first amplitude value is an amplitude of the first I/Q signal before the quantization; and determine a first phase value of the first I/Q signal according to the second phase value and the phase quantization level, where the first phase value is a phase of the first I/Q signal before the quantization; and a recovering unit 23, configured to recover the first I/Q signal according to the first amplitude value and the first phase value.

Further, the determining unit 22 is specifically configured to: query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and determine a product of the second amplitude value and the amplitude quantization factor as the first amplitude value.

Further, the determining unit 22 is specifically configured to: query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and determine a product of the second phase value and the phase quantization factor as the first phase value.

Further, the receiving unit 21 is specifically configured to: receive the amplitude quantization level and the phase quantization level at a control word bit in the Common Public Radio Interface CPRI protocol, and receive the second amplitude value and the second phase value at a data word bit in the CPRI protocol.

Further, the recovering unit 23 is specifically configured to: recover, by using an inverse operation of a coordinate rotation digital computer method, the first I/Q signal that is mapped to a first quadrant in a Cartesian coordinate system; and perform I/Q signal inverse mapping, and recover the first I/Q signal from the first I/Q signal that is mapped to the first quadrant.

This embodiment of the present application provides an I/Q signal transmission apparatus. The sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to the receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application, an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

Embodiment 4

Figure 7:
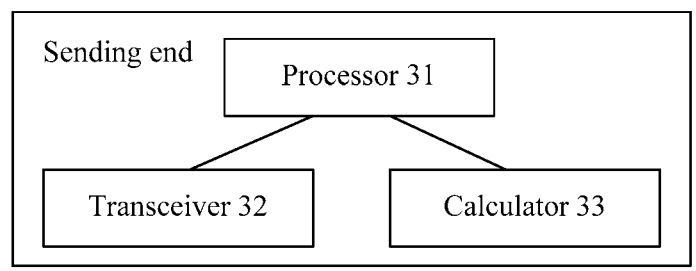
FIG. 7 is a schematic diagram of hardware of a sending end according to an embodiment of the present application.

FIG. 7 is a schematic structural diagram of a sending end according to an embodiment of the present application. The sending end provided in this embodiment of the present application may be configured to implement the methods implemented in the embodiments of the present application shown in FIG. 1 to FIG. 4. For convenience of description, merely a part related to this embodiment of the present application is shown. For a specific technical detail that is not disclosed, refer to the embodiments of the present application shown in FIG. 1 to FIG. 4.

The sending end may be specifically an REC, an RE, or any chip. This is not limited in the present application.

Specifically, the sending end includes a processor 31, and a transceiver 32 and a calculator 33 that are both connected to the processor 31, where the calculator 33 is configured to calculate a first amplitude value and a first phase value of a first I/Q signal;

the transceiver 32 is configured to obtain an amplitude quantization level of the first amplitude value and a phase quantization level of the first phase value, where the amplitude quantization level is used to indicate an amplitude value transmitted per unit of bit width, and the phase quantization level is used to indicate a phase value transmitted per unit of bit width;

the processor 31 is configured to: quantize the first amplitude value according to the amplitude quantization level, to obtain a second amplitude value after the quantization, and quantize the first phase value according to the phase quantization level, to obtain a second phase value after the quantization; and the transceiver 32 is configured to transmit the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

Further, the processor 31 is further configured to determine a specified bit width for sending the first I/Q signal; and the calculator 33 is further configured to: determine a ratio of the first amplitude value to the specified bit width as the amplitude quantization level, and determine a ratio of the first phase value to the specified bit width as the phase quantization level.

Further, the processor 31 is further configured to determine a specified bit width for sending the first I/Q signal; and the calculator 33 is further configured to: calculate a maximum amplitude value in amplitude values of N I/Q signals, and a maximum phase value in phase values of the N I/Q signals, where the first I/Q signal is any I/Q signal in an I/Q signal group that includes the N I/Q signals, and N>1; and determine a ratio of the maximum amplitude value to the specified bit width as the amplitude quantization level, and determine a ratio of the maximum phase value to the specified bit width as the phase quantization level.

Further, the processor 31 is further configured to query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and the calculator 33 is further configured to use a product of the first amplitude value and the amplitude quantization factor as the second amplitude value.

Further, the processor 31 is further configured to query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and the calculator 33 is further configured to use a product of the first phase value and the phase quantization factor as the second phase value.

Further, the transceiver 32 is further configured to: transmit the amplitude quantization level and the phase quantization level by using a control word bit in the Common Public Radio Interface CPRI protocol, and transmit the second amplitude value and the second phase value by using a data word bit in the CPRI protocol.

Further, the calculator 33 is further configured to: map the first I/Q signal to a first quadrant in a Cartesian coordinate system; and extract, by using a coordinate rotation digital computer method, the first amplitude value and the first phase value from the first I/Q signal after the mapping.

Figure 8:
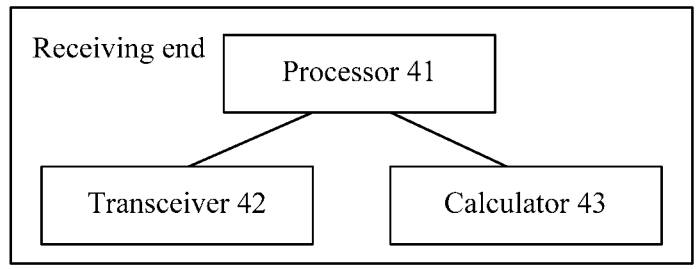
FIG. 8 is a schematic diagram of hardware of a receiving end according to an embodiment of the present application.

FIG. 8 is a schematic structural diagram of a receiving end according to an embodiment of the present application. The receiving end provided in this embodiment of the present application may be configured to implement the methods implemented in the embodiments of the present application shown in FIG. 1 to FIG. 4. For convenience of description, merely a part related to this embodiment of the present application is shown. For a specific technical detail that is not disclosed, refer to the embodiments of the present application shown in FIG. 1 to FIG. 4.

The receiving end may be specifically an REC, an RE, or any chip. This is not limited in the present application.

Specifically, the receiving end includes a processor 41, and a transceiver 42 and a calculator 43 that are both connected to the processor 41, where the transceiver 42 is configured to receive a second amplitude value, a second phase value, an amplitude quantization level, and a phase quantization level of a first I/Q signal that is sent by a sending end, where the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;

the processor 41 is configured to: determine a first amplitude value of the first I/Q signal according to the second amplitude value and the amplitude quantization level, where the first amplitude value is an amplitude of the first I/Q signal before the quantization; and determine a first phase value of the first I/Q signal according to the second phase value and the phase quantization level, where the first phase value is a phase of the first I/Q signal before the quantization; and the calculator 43 is configured to recover the first I/Q signal according to the first amplitude value and the first phase value.

Further, the processor 41 is further configured to query a preset first quantization factor table for an amplitude quantization factor corresponding to the amplitude quantization level, where the first quantization factor table stores a correspondence between amplitude quantization levels and amplitude quantization factors, and the amplitude quantization factor is used to indicate a bit width occupied per unit of amplitude value; and the calculator 43 is further configured to determine a product of the second amplitude value and the amplitude quantization factor as the first amplitude value.

Further, the processor 41 is further configured to query a preset second quantization factor table for a phase quantization factor corresponding to the phase quantization level, where the second quantization factor table stores a correspondence between phase quantization levels and phase quantization factors, and the phase quantization factor is used to indicate a bit width occupied per unit of phase value; and the calculator 43 is further configured to determine a product of the second phase value and the phase quantization factor as the first phase value.

Further, the transceiver 42 is further configured to: receive the amplitude quantization level and the phase quantization level at a control word bit in the Common Public Radio Interface CPRI protocol, and receive the second amplitude value and the second phase value at a data word bit in the CPRI protocol.

Further, the calculator 43 is further configured to: recover, by using an inverse operation of a coordinate rotation digital computer method, the first I/Q signal that is mapped to a first quadrant in a Cartesian coordinate system; and perform I/Q signal inverse mapping, and recover the first I/Q signal from the first I/Q signal that is mapped to the first quadrant.

This embodiment of the present application provides an I/Q signal transmission apparatus. The sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to a receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application, an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

Embodiment 5

Figure 9:
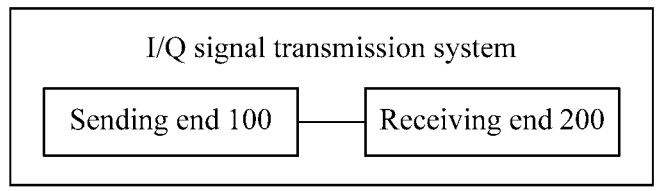
FIG. 9 is a schematic structural diagram 1 of an I/Q signal transmission system according to an embodiment of the present application.

An embodiment of the present application provides an I/Q signal transmission system. As shown in FIG. 9, the system includes a sending end 100 and a receiving end 200, where for a method of I/Q signal transmission between the sending end 100 and the receiving end 200, refer to Embodiment 1 to Embodiment 3, and therefore details are not described herein again.

It should be noted that, the I/Q signal transmission system may be any communications system that is based on the I/Q signal transmission. The sending end 100 may be specifically an REC, an RE, or any chip. The receiving end 200 may also be an REC, an RE, or any chip.

Figure 10:
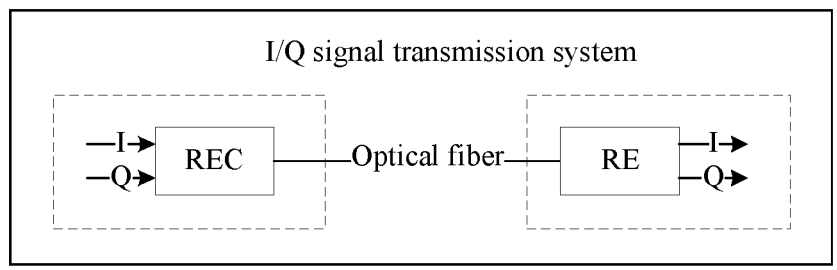
FIG. 10 is a schematic structural diagram 2 of an I/Q signal transmission system according to an embodiment of the present application.

For example, in the I/Q signal transmission system shown in FIG. 10, when the sending end 100 is an REC and the receiving end 200 is an RE, an I/Q signal may be transmitted between the REC and the RE by using the CPRI protocol by means of an optical fiber.

Figure 11:
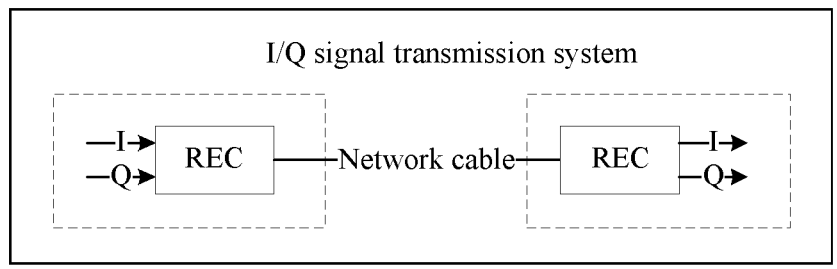
FIG. 11 is a schematic structural diagram 3 of an I/Q signal transmission system according to an embodiment of the present application.
Figure 12:
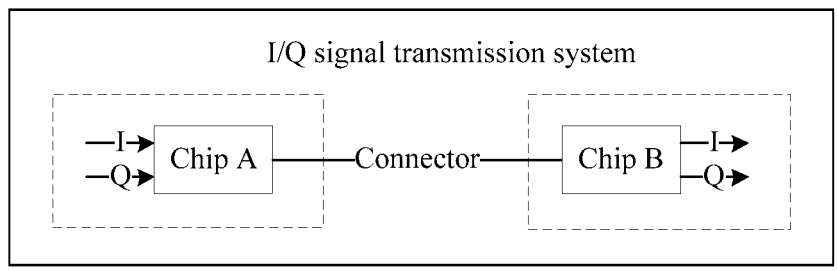
FIG. 12 is a schematic structural diagram 4 of an I/Q signal transmission system according to an embodiment of the present application.

Alternatively, in the I/Q signal transmission system shown in FIG. 11, when the sending end 100 is an REC and the receiving end 200 is also an REC, an I/Q signal may be further transmitted between the REC and the REC by using the CPRI protocol by means of a network cable.

Alternatively, in the I/Q signal transmission system shown in FIG. 11, when the sending end 100 is a chip A on a board and the receiving end 200 is a chip B on the board, an I/Q signal may be transmitted between the chip A and the chip B by using a connector.

Hereto, this embodiment of the present application provides an I/Q signal transmission system. The sending end calculates a first amplitude value and a first phase value of a to-be-sent first I/Q signal, determines an amplitude quantization level and a phase quantization level, then quantizes the first amplitude value according to the amplitude quantization level, and quantizes the first phase value according to the phase quantization level, so as to send a second amplitude value and a second phase value of the first I/Q signal after the quantization to the receiving end, and also send the amplitude quantization level and the phase quantization level to the receiving end, so that the receiving end recovers the first amplitude value and the first phase value before the quantization from the second amplitude value and the second phase value after the quantization, and then recovers the first I/Q signal according to the first amplitude value and the first phase value. It can be learned that, compared with the prior art in which bit width compression is directly performed on an I/Q signal, in the present application, an I/Q signal is switched into vector space and then an amplitude and a phase of the I/Q signal are quantized, so that the receiving end relatively correctly recovers, according to an amplitude and a phase after the quantization, the I/Q signal before the quantization. This can mitigate a problem of signal distortion in a wireless communication process to an extent, and increase communication efficiency of a radio device.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An in-phase/quadrature (I/Q) signal transmission method, comprising:
calculating, by a sending end, a first amplitude value and a first phase value of a first I/Q signal;
obtaining, by the sending end, an amplitude quantization level of the first amplitude value and a phase quantization level of the first phase value, wherein the amplitude quantization level is used to indicate an amplitude value transmitted per unit of bit width, and the phase quantization level is used to indicate a phase value transmitted per unit of bit width;
quantizing, by the sending end, the first amplitude value according to the amplitude quantization level, to obtain a second amplitude value after the quantization, and quantizing the first phase value according to the phase quantization level, to obtain a second phase value after the quantization; and
transmitting, by the sending end, the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

2. The method according to claim 1, wherein the obtaining, by the sending end, the amplitude quantization level of the first amplitude value and the phase quantization level of the first phase value comprises:
determining, by the sending end, a specified bit width for sending the first I/Q signal; and
determining, by the sending end, a ratio of the first amplitude value to the specified bit width as the amplitude quantization level, and determining a ratio of the first phase value to the specified bit width as the phase quantization level.

3. The method according to claim 1, wherein the obtaining, by the sending end, the amplitude quantization level of the first amplitude value and the phase quantization level of the first phase value comprises:
- determining, by the sending end, a specified bit width for sending the first I/Q signal;
- calculating, by the sending end, a maximum amplitude value in amplitude values of N I/Q signals, and a maximum phase value in phase values of the N I/Q signals, wherein the first I/Q signal is any I/Q signal in an I/Q signal group that comprises the N I/Q signals, and N>1; and
- determining, by the sending end, a ratio of the maximum amplitude value to the specified bit width as the amplitude quantization level, and determining a ratio of the maximum phase value to the specified bit width as the phase quantization level.

4. The method according to claim 1, wherein the quantizing, by the sending end, the first amplitude value according to the amplitude quantization level, to obtain the second amplitude value after the quantization comprises:
- querying, by the sending end, a preset first quantization factor table for an amplitude quantization factor corresponding to the amplitude quantization level, wherein the first quantization factor table stores a correspondence between amplitude quantization levels and amplitude quantization factors, and the amplitude quantization factor is used to indicate a bit width occupied per unit of amplitude value; and
- using, by the sending end, a product of the first amplitude value and the amplitude quantization factor as the second amplitude value.

5. The method according to claim 1, wherein the quantizing the first phase value according to the phase quantization level, to obtain the second phase value after the quantization comprises:
- querying, by the sending end, a preset second quantization factor table for a phase quantization factor corresponding to the phase quantization level, wherein the second quantization factor table stores a correspondence between phase quantization levels and phase quantization factors, and the phase quantization factor is used to indicate a bit width occupied per unit of phase value; and
- using, by the sending end, a product of the first phase value and the phase quantization factor as the second phase value.

6. The method according to claim 1, wherein the transmitting, by the sending end, the second amplitude value, the second phase value, the amplitude quantization level, and the phase quantization level to the receiving end comprises:
- transmitting, by the sending end, the amplitude quantization level and the phase quantization level by using a control word bit in an Common Public Radio Interface (CPRI) protocol, and transmitting the second amplitude value and the second phase value by using a data word bit in the CPRI protocol.

7. The method according to claim 1, wherein the calculating, by the sending end, the first amplitude value and the first phase value of the first I/Q signal comprises:
- mapping, by the sending end, the first I/Q signal to a first quadrant in a Cartesian coordinate system; and
- extracting, by the sending end by using a coordinate rotation digital computer method, the first amplitude value and the first phase value from the first I/Q signal after the mapping.

8. A sending end, comprising a processor, and a calculator and a transceiver that are both connected to the processor, wherein the calculator is configured to calculate a first amplitude value and a first phase value of a first in-phase/quadrature (I/Q) signal;
the transceiver is configured to obtain an amplitude quantization level of the first amplitude value and a phase quantization level of the first phase value, wherein the amplitude quantization level is used to indicate an amplitude value transmitted per unit of bit width, and the phase quantization level is used to indicate a phase value transmitted per unit of bit width;
the processor is configured to: quantize the first amplitude value according to the amplitude quantization level, to obtain a second amplitude value after the quantization, and quantize the first phase value according to the phase quantization level, to obtain a second phase value after the quantization; and
the transceiver is configured to transmit the second amplitude value, the second phase value, the amplitude quantization level, and the phase quantization level to a receiving end, so that the receiving end recovers the first I/Q signal according to the second amplitude value, the second phase value, the amplitude quantization level, and the phase quantization level.

9. The sending end according to claim 8, wherein
the processor is further configured to determine a specified bit width for sending the first I/Q signal; and
the calculator is further configured to: determine a ratio of the first amplitude value to the specified bit width as the amplitude quantization level, and determine a ratio of the first phase value to the specified bit width as the phase quantization level.

10. The sending end according to claim 8, wherein
the processor is further configured to determine a specified bit width for sending the first I/Q signal; and
the calculator is further configured to: calculate a maximum amplitude value in amplitude values of N I/Q signals, and a maximum phase value in phase values of the N I/Q signals, wherein the first I/Q signal is any I/Q signal in an I/Q signal group that comprises the N I/Q signals, and N>1; and determine a ratio of the maximum amplitude value to the specified bit width as the amplitude quantization level, and determine a ratio of the maximum phase value to the specified bit width as the phase quantization level.

11. The sending end according to claim 8, wherein
the processor is further configured to query a preset first quantization factor table for an amplitude quantization factor corresponding to the amplitude quantization level, wherein the first quantization factor table stores a correspondence between amplitude quantization levels and amplitude quantization factors, and the amplitude quantization factor is used to indicate a bit width occupied per unit of amplitude value; and
the calculator is further configured to use a product of the first amplitude value and the amplitude quantization factor as the second amplitude value.

12. The sending end according to claim 8, wherein
the processor is further configured to query a preset second quantization factor table for a phase quantization factor corresponding to the phase quantization level, wherein the second quantization factor table stores a correspondence between phase quantization levels and phase quantization factors, and the phase quantization factor is used to indicate a bit width occupied per unit of phase value; and the calculator is further configured to use a product of the first phase value and the phase quantization factor as the second phase value.

13. The sending end according to claim 8, wherein the transceiver is further configured to: transmit the amplitude quantization level and the phase quantization level by using a control word bit in an Common Public Radio Interface CPRI protocol, and transmit the second amplitude value and the second phase value by using a data word bit in the CPRI protocol.

14. The sending end according to claim 8, wherein the calculator is further configured to: map the first I/Q signal to a first quadrant in a Cartesian coordinate system; and extract, by using a coordinate rotation digital computer method, the first amplitude value and the first phase value from the first I/Q signal after the mapping.

15. A receiving end, comprising a processor, and a transceiver and a calculator that are both connected to the processor, wherein
the transceiver is configured to receive a second amplitude value, a second phase value, an amplitude quantization level, and a phase quantization level of a first in-phase/quadrature (I/Q) signal that is sent by a sending end, wherein the second amplitude value is an amplitude of the first I/Q signal after quantization, the second phase value is a phase of the first I/Q signal after quantization, the amplitude quantization level is used to indicate an amplitude value transmitted per unit of bit width, and the phase quantization level is used to indicate a phase value transmitted per unit of bit width;
the processor is configured to: determine a first amplitude value of the first I/Q signal according to the second amplitude value and the amplitude quantization level, wherein the first amplitude value is an amplitude of the first I/Q signal before the quantization; and determine a first phase value of the first I/Q signal according to the second phase value and the phase quantization level, wherein the first phase value is a phase of the first I/Q signal before the quantization; and
the calculator is configured to recover the first I/Q signal according to the first amplitude value and the first phase value.

16. The receiving end according to claim 15, wherein
the processor is further configured to query a preset first quantization factor table for an amplitude quantization factor corresponding to the amplitude quantization level, wherein the first quantization factor table stores a correspondence between amplitude quantization levels and amplitude quantization factors, and the amplitude quantization factor is used to indicate a bit width occupied per unit of amplitude value; and
the calculator is further configured to determine a product of the second amplitude value and the amplitude quantization factor as the first amplitude value.

17. The receiving end according to claim 15, wherein
the processor is further configured to query a preset second quantization factor table for a phase quantization factor corresponding to the phase quantization level, wherein the second quantization factor table stores a correspondence between phase quantization levels and phase quantization factors, and the phase quantization factor is used to indicate a bit width occupied per unit of phase value; and
the calculator is further configured to determine a product of the second phase value and the phase quantization factor as the first phase value.

18. The receiving end according to claim 15, wherein
the transceiver is further configured to: receive the amplitude quantization level and the phase quantization level at a control word bit in an Common Public Radio Interface (CPRI) protocol, and receive the second amplitude value and the second phase value at a data word bit in the CPRI protocol.

19. The receiving end according to claim 15, wherein
the calculator is further configured to: recover, by using an inverse operation of a coordinate rotation digital computer method, the first I/Q signal that is mapped to a first quadrant in a Cartesian coordinate system; and perform I/Q signal inverse mapping, and recover the first I/Q signal from the first I/Q signal that is mapped to the first quadrant.

* * * * *